United States Patent [19]

Wydra

[11] 4,297,921
[45] Nov. 3, 1981

[54] CIRCULAR SAW BLADE REMOVING COMBINATION

[76] Inventor: Wally Wydra, 723 N. Walnut, Itasca, Ill. 60143

[21] Appl. No.: 65,610

[22] Filed: Aug. 10, 1979

[51] Int. Cl.³ .................. B23D 57/00; B25B 11/00
[52] U.S. Cl. .................................... 81/3 R; 83/481;
29/283; 29/426.5; 188/82.8; 254/104
[58] Field of Search ............... 81/3 R; 254/104;
83/481, 477.2; 29/283, 426, 427; 188/136, 82.8,
74, 29, 57; 145/108 R, 113; D12/217; 76/78 A

[56] References Cited

U.S. PATENT DOCUMENTS

| Re. 14,306 | 5/1917 | Evans | 188/32 |
|---|---|---|---|
| D. 219,236 | 11/1970 | Hudak et al. | D12/217 |
| 608,561 | 8/1898 | Sauvage | 188/74 |
| 741,034 | 10/1903 | Hazelton | 81/121 R |
| 1,427,222 | 8/1922 | Miller | 144/309 G |
| 1,496,548 | 6/1924 | Knight | 188/74 |
| 2,774,178 | 12/1956 | Nelson | 81/3 R |
| 2,993,518 | 7/1961 | Bork | 30/391 |

FOREIGN PATENT DOCUMENTS

| 1062088 | 7/1959 | Fed. Rep. of Germany | 81/3 R |
| 75830 | 5/1931 | Sweden | 145/113 |

*Primary Examiner*—Roscoe V. Parker
*Attorney, Agent, or Firm*—Robert G. Petrinec

[57] ABSTRACT

A tool for use with a circular-blade power saw to facilitate removal of the circular saw blade from the power driven shaft connected thereto. The tool is of a one piece configuration comprising a body portion, a nose portion and a circular blade engaging portion between the body portion and the nose portion. The tool is inserted into the slot formed in the support surface of the saw table and wedged against the circular saw blade. With the circular blade held against rotation in this manner, the lock nut holding the circular saw blade to the power shaft can be removed.

7 Claims, 4 Drawing Figures

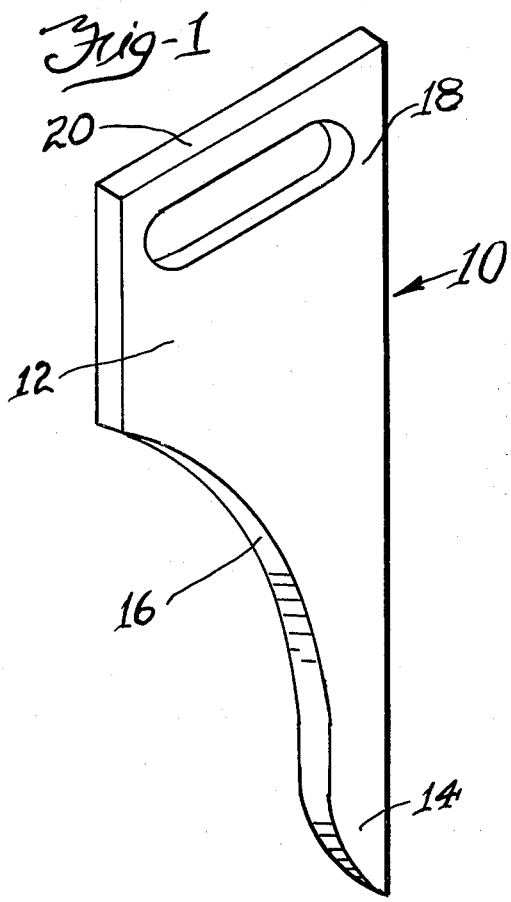
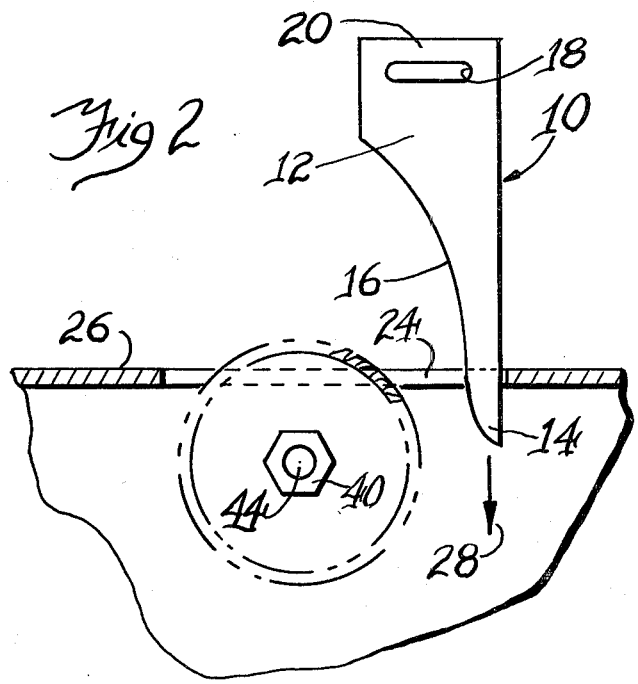
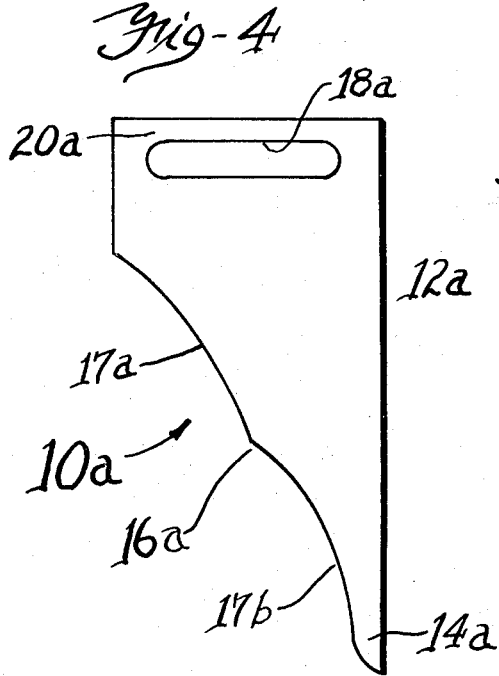
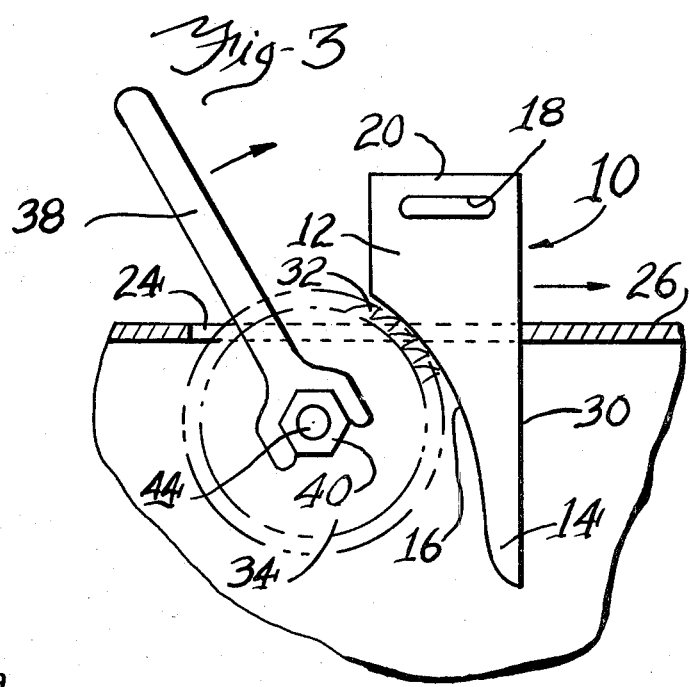

CIRCULAR SAW BLADE REMOVING COMBINATION

BRIEF DESCRIPTION OF THE PRIOR ART

Prior art patent relating to the subject matter of the present invention were found during a preliminary patentability search. These prior art patents are, U.S. Pat. No. Re: 14,306; U.S. Pat. Nos. 741,034; 1,427,222; and 2,993,518. None of these patents show the present invention.

One method shown by the prior art for removing a circular saw blade from its driven shaft is to use a wrench to engage flat spots formed on the drive shaft connected to the saw blade. This would hold the drive shaft while a second wrench was used to loosen a lock nut holding the saw blade to the drive shaft. This procedure required two wrenches, both of which are positioned beneath the table support surface, which makes it difficult to get at the lock nut and shaft.

BRIEF SUMMARY OF THE INVENTION

Accordingly, it is an object of the present invention to provide a new and improved tool for use in removing a circular saw blade from a power saw.

Another object of the present invention is to provide a tool for use in the removal of circular saw blades, which tool is inexpensive to manufacture and simple and efficient to use.

Many other objects, features and advantages of the present invention will be more fully realized and understood from the following detailed description when taken in conjunction with the following drawings wherein like reference numerals throughout the various views of the drawings are intended to designate similar elements or components.

BRIEF DESCRIPTION OF THE DRAWINGS

FIG. 1 is a perspective view of a tool constructed in accordance with this invention;

FIG. 2 is a side elevational view showing the initial position of insertion of the tool into a circular power saw;

FIG. 3 is a side elevational view showing the final position of insertion of the tool into a circular power saw; and FIG. 4 is a side elevational view of an alternate embodiment of the tool of the present invention.

DETAILED DESCRIPTION OF THE ILLUSTRATED EMBODIMENTS

Referring now to FIGS. 1, 2 and 3, one form of tool of the present invention is shown and is designated generally by reference numeral 10. The tool 10 includes a main body portion 12 and a nose portion 14 extending therefrom. The tool 10 further includes a circular blade engaging portion 16 which is approximately of the same radius of curvature as the circular saw blade to be engaged therewith. Preferably a hole 18 is formed in the upper portion of the body 12 and forms a convenient handle 20. In the illustrated embodiment of the present invention, the tool is made of hard wood such as oak or the like. It will be understood however, that other materials may be used without departing from the concepts of this invention.

In use the tool 10 is inserted into a slot 24 which is formed in a support surface 26 of a circular-blade power saw. Only a fragmentary portion of the power saw is shown herein for purpose of explanation only and forms no part of the present invention. As the tool 10 is inserted into the slot 24 it is urged downward as illustrated by arrow 28, FIG. 2. The tool is inserted until the back edge 30 is urged against the support surface 26 and teeth 32 of a saw blade 34 come in contact with the blade engaging portion 16. A wrench 38 is then placed over a lock nut 40 to loosen the nut and allow removal of the saw blade 34 from a power drive shaft 44. With the tool 10 inserted in this manner, and with a slight downward pressure, the blade engaging portion 16 will prevent turning of the saw blade which in turn, prevents turning of the power shaft to enable easy loosening of the lock nut 40. The thread direction on the power drive shaft 44 may be either left hand, as shown, or right hand, without departing from this invention.

Referring now to FIG. 4 there is seen an alternate embodiment of the tool of this invention and is here designated by reference numeral 10a. The tool 10a includes a main body portion 12a and a nose portion 14a extending therefrom. The tool 10a further includes a circular blade engaging portion 16a. Here, the blade engaging portion 16a includes at least two areas of different radius of curvature 17a and 17b. This configuration enables a single tool to be used on a number of different diameter saw blades. In this configuration a handle 20a also is formed by a hole 18a.

While only two embodiments of the present invention are shown herein in detail it will be understood that many variations and modifications of the invention may be made without departing from the spirit and scope of the following claims.

The invention is claimed as follows:

1. In combination: a support surface having a slot formed therein to enable a circular saw blade to extend therethrough; shaft means for receiving said circular saw blade in alignment with the slot in said support surface; locking means removably secured to said shaft means for securing said circular saw blade to said shaft means; a main body portion and a nose portion extending therefrom to form a tool; a circular-blade engaging portion formed on said nose portion, said nose portion insertable into said slot to have said circular-blade engaging portion urged against said circular saw blade for holding said blade against rotation; whereby said locking means is easily removed from said shaft to facilitate removal of said circular saw blade.

2. The combination set forth in claim 1 wherein said circular-blade engaging portion is substantially of the same radius as the circular blade engaged therewith.

3. The combination set forth in claim 1 wherein said body portion, circular blade engaging portion and said nose portion are formed of one piece of material.

4. The combination set forth in claim 3 wherein said one piece of material is of hard wood.

5. The combination set forth in claim 1 further including a handle portion formed on said body portion.

6. The combination set forth in claim 5 wherein said handle portion includes an opening form therein.

7. The combination set forth in claim 1 wherein said blade engaging portion includes two separate radius portions, one leading into the other.

* * * * *